(12) United States Patent
Berard

(10) Patent No.: US 7,349,773 B2
(45) Date of Patent: Mar. 25, 2008

(54) METHOD AND DEVICE FOR PROVIDING AN AIRCRAFT WITH A FLIGHT TRAJECTORY

(75) Inventor: Jérémy Berard, Fenouillet (FR)

(73) Assignee: Airbus France, Toulouse (FR)

( * ) Notice: Subject to any disclaimer, the term of this patent is extended or adjusted under 35 U.S.C. 154(b) by 408 days.

(21) Appl. No.: 11/118,315

(22) Filed: May 2, 2005

(65) Prior Publication Data

US 2006/0085101 A1   Apr. 20, 2006

(30) Foreign Application Priority Data

May 18, 2004   (FR) .................................. 04 05377

(51) Int. Cl.
*G01C 23/00* (2006.01)
(52) U.S. Cl. .......................................... 701/3; 701/209
(58) Field of Classification Search .................... 701/3, 701/4, 11, 200, 201, 207, 208, 209, 210, 224; 342/357.13, 357
See application file for complete search history.

(56) References Cited

U.S. PATENT DOCUMENTS 5,406,491 A    4/1995  Lima
5,774,362 A *  6/1998  Suzuki et al. ................ 701/208
6,411,895 B1*  6/2002  Lau et al. .................... 701/209
6,519,527 B2*  2/2003  Shinagawa ................... 701/209
7,231,293 B2*  6/2007  Lapstun et al. ............. 701/202

FOREIGN PATENT DOCUMENTS

GB        1375181        11/1974
WO   2004/029551 A1     4/2004

OTHER PUBLICATIONS

Preliminary Search Report dated Nov. 30, 2004.

\* cited by examiner

*Primary Examiner*—Richard M. Camby
(74) *Attorney, Agent, or Firm*—Stevens, Davis, Miller & Mosher, LLP

(57) ABSTRACT

A device includes a first unit for defining a main trajectory, which is followed by the aircraft, and an optional trajectory which deviates from the main trajectory, which exhibits at least one common point shared with said main trajectory and which is able to be followed by the aircraft if the trajectory is activated. The device also includes a second unit for automatically determining a decision point which indicates the last position of the aircraft along the main trajectory, where the optional trajectory can still be activated so as to allow the aircraft to follow it. The device further includes a third unit for automatically presenting the decision point to a pilot of the aircraft, and an actuatable unit which allows a pilot to activate the optional trajectory.

13 Claims, 3 Drawing Sheets

Figure 1:
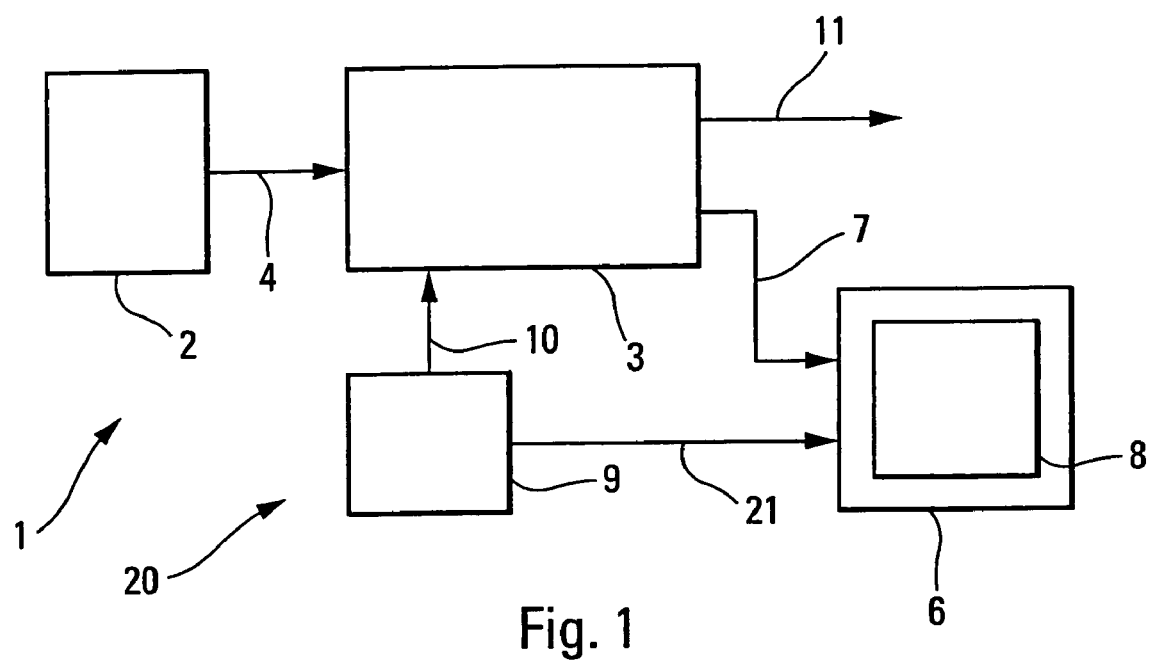

METHOD AND DEVICE FOR PROVIDING AN AIRCRAFT WITH A FLIGHT TRAJECTORY

FIELD OF THE INVENTION

The present invention relates to a method and a device for providing an aircraft, in particular a military transport plane, with a flight trajectory, as well as to an automatic guidance system comprising such a device.

SUMMARY OF THE INVENTION

According to the invention, said method is noteworthy in that:

a) a main trajectory, which is followed by the aircraft, and at least one optional trajectory which deviates from said main trajectory, which exhibits at least one common point shared with said main trajectory and which is able to be followed by the aircraft if said trajectory is activated is defined;
b) a decision point which indicates the last position of the aircraft along said main trajectory, where said optional trajectory can still be activated so as to allow the aircraft to follow it is determined automatically;
c) said decision point is presented automatically to a pilot of the aircraft; and
d) the pilot can, at least as a function of this presentation, activate said optional trajectory.

Thus, by virtue of the invention, the pilot of the aircraft knows the last point (decision point), where he can still activate said optional trajectory so as to allow the aircraft to follow it. Up to said decision point, the pilot is therefore presented with two alternatives allowing him:

either to continue to follow the initial main trajectory, this requiring no particular action (or activation) on his part;
or to activate said optional trajectory, so as to follow the latter.

In a preferred embodiment, to determine said decision point:

on the basis of said common point, successively, for each point following said main trajectory, in the direction of flight of the aircraft, a check is carried out to verify whether this point also belongs to said optional trajectory; and
as soon as a point no longer belongs to said optional trajectory, account is taken of the previous point which still belonged to said optional trajectory and this previous point is regarded as decision point.

It will be noted that the present invention applies to any type of flight trajectory (as regards main and optional trajectories). In particular, it applies:

to a two-dimensional flight trajectory. In this case, advantageously, a check is carried out to verify, in a lateral plane, whether a point of the main trajectory also belongs to the optional trajectory, so as to implement the aforesaid preferred embodiment; and
to a three-dimensional flight trajectory. In this case, advantageously, a check is carried out to verify, in the whole of space, whether a point of the main trajectory also belongs to the optional trajectory, so as to implement the aforesaid preferred embodiment.

In a particular embodiment, if in step d) the pilot activates said optional trajectory which then becomes the new trajectory followed by the aircraft, the main trajectory initially followed by the aircraft is transformed into a new optional trajectory.

Thus, the pilot can choose to swap the main route and the optional route, and can do so at any moment up to said decision point. This makes it possible in particular to go back after an activation made in error. Naturally, beyond said decision point, only the flight trajectory chosen, from among said main and optional trajectories, is preserved.

The present invention also relates to a device for providing aircraft with a flight trajectory.

According to the invention, said device is noteworthy in that it comprises:

first means for defining a main trajectory, which is followed by the aircraft, and an optional trajectory which deviates from said main trajectory, which exhibits at least one common point shared with said main trajectory and which is able to be followed by the aircraft if said trajectory is activated;
second means for automatically determining a decision point which indicates the last position of the aircraft along said main trajectory, where said optional trajectory can still be activated so as to allow the aircraft to follow it;
third means for automatically presenting said decision point to a pilot of the aircraft; and
fourth means which are actuatable, allowing a pilot to activate said optional trajectory.

Moreover, advantageously, said third means may comprise a head-up display screen and/or a head-down display screen.

Furthermore, in a preferred embodiment, said fourth means comprise interactive means of control. This preferred embodiment allows simplified activation and uses modern interactive means of control which are very efficacious.

The present invention also relates to an automatic guidance system for an aircraft, of the type comprising:

a set of information sources;
an auxiliary source of information able to provide a flight trajectory;
a central unit for automatically determining orders for steering the aircraft, with the aid of information received from said set of information sources and a flight trajectory provided by said auxiliary source of information; and
means of actuation of controlled members of the aircraft, to which the steering orders determined by said central unit are applied automatically.

According to the invention, said automatic guidance system is noteworthy in that said auxiliary source of information comprises a device of the aforementioned type, for providing the aircraft with a flight trajectory.

BRIEF DESCRIPTION OF THE INVENTION

The figures of the appended drawing will elucidate the manner in which the invention may be embodied. In these figures, identical references designate similar elements.

FIG. 1 is the schematic diagram of a device in accordance with the invention.

Figure 2:
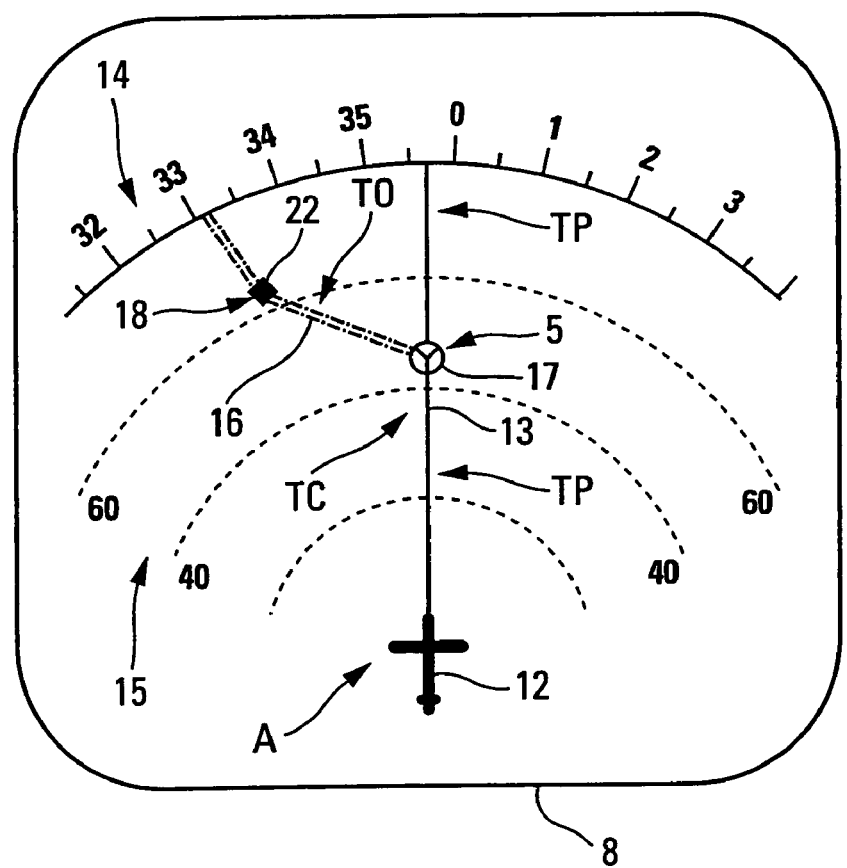

FIG. 2 diagrammatically shows a display in accordance with a first embodiment.

Figure 3:
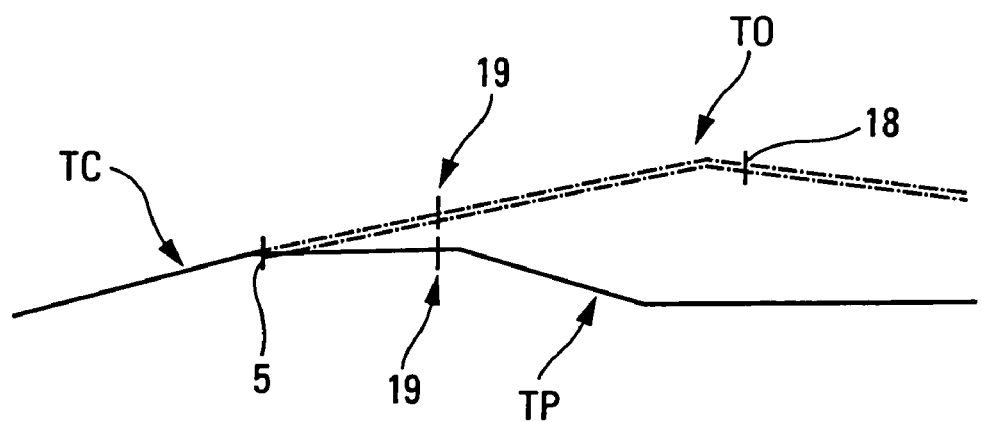

FIG. 3 illustrates a graph relating to a second embodiment.

Figure 4:
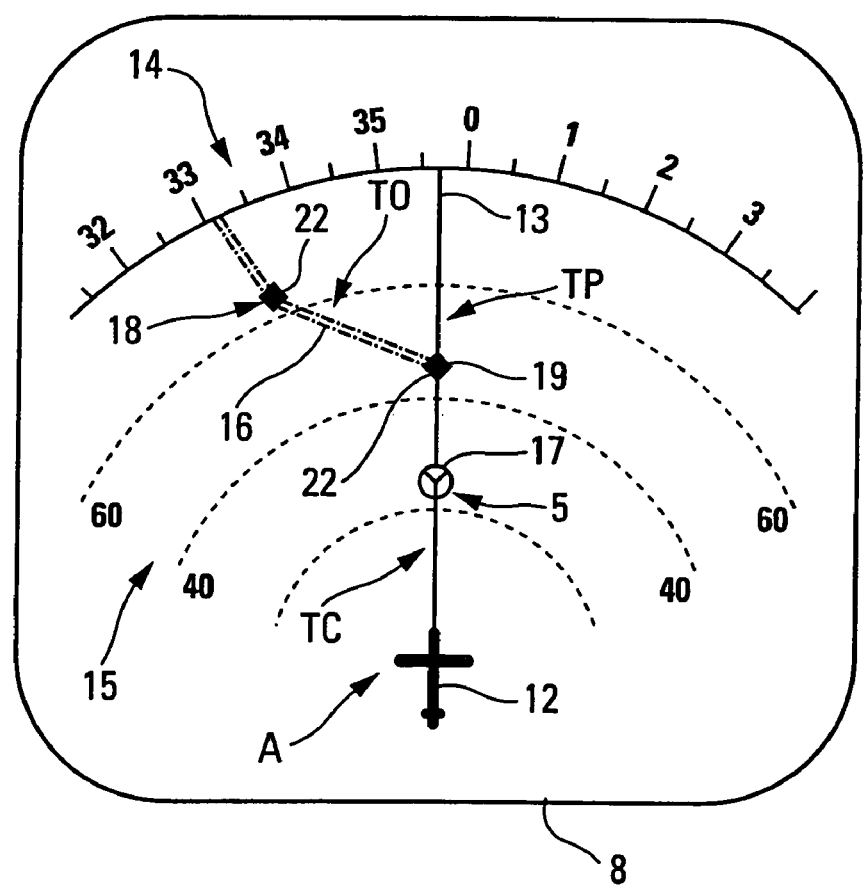

FIG. 4 diagrammatically shows a display in accordance with the second embodiment of FIG. 3.

Figure 5:
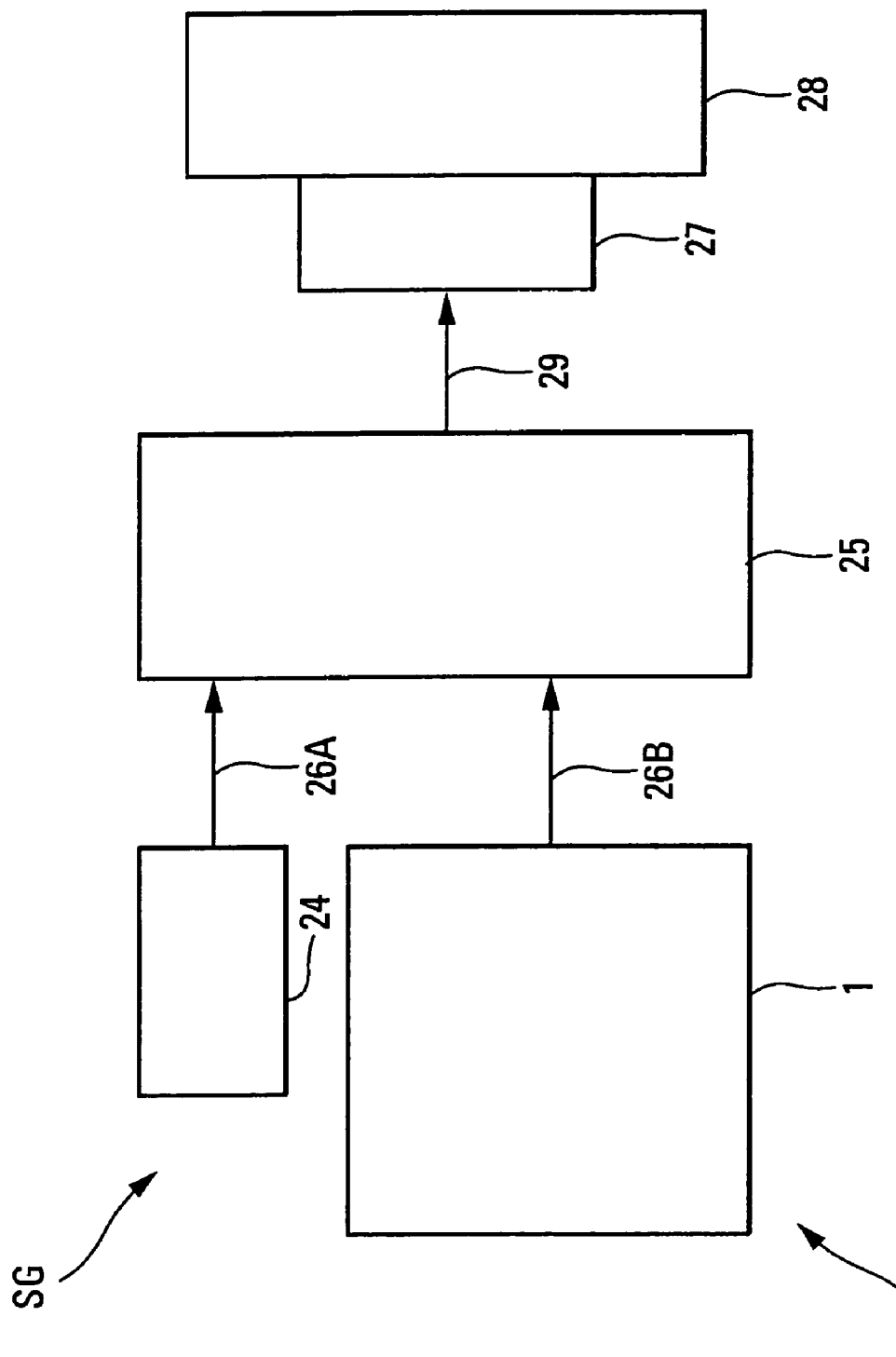

FIG. 5 is the schematic diagram of a guidance system in accordance with the invention.

DETAILED DESCRIPTION OF THE INVENTION

The device 1 in accordance with the invention and represented diagrammatically in FIG. 1 is intended to provide an aircraft A, in particular a military transport plane, with a flight trajectory.

According to the invention, said device 1 which is carried on board the aircraft A, comprises:

- standard means 2, for defining a main trajectory TP which is followed by the aircraft A, as specified for example hereinbelow with reference to FIG. 5, and an optional trajectory TO which exhibits at least one common point (and generally an entire common stretch TC) shared with said main trajectory TP and which is able to be followed by the aircraft A if said trajectory is activated;
- means 3 which are connected by a link 4 to said means 2 and which are able to automatically determine a decision point 5 which indicates the last position of the aircraft A along said trajectory TP which it follows, where said optional trajectory TO can still be activated (as specified hereinbelow) so as to allow the aircraft A to then follow this optional trajectory TO (instead of following said main trajectory TP);
- display means 6 which are connected by a link 7 to said means 3 and which are able to automatically present said decision point 5 on a display screen 8 specified hereinbelow, to a pilot of the aircraft A; and
- standard means 9, which are connected by a link 10 to said means 3, which are actuatable and which allow a pilot to activate said optional trajectory TO. Following such an activation, the aircraft A takes account in standard fashion of said optional trajectory TO (in place of the main trajectory TP), in particular for its guidance and/or for prediction computations (transit time, fuel available, speed, etc.).

Said decision point 5 can also be provided by said means 3 to other user devices (not represented), for example by way of a link 11.

Furthermore, according to the invention, said display screen 8 may be a head-up screen, for example of HUD ("Head Up Display") type, or a navigation screen, for example of ND ("Navigation Display") type, as represented in FIGS. 2 and 4.

Such a navigation screen ND illustrates the situation of the aircraft A (lateral flight plan) in a horizontal plane and comprises:

- a symbol 12 illustrating the current position of the aircraft A;
- a plot 13 showing the main trajectory TP in the horizontal plane, that is to say the main route which is followed by the aircraft A;
- a standard graduation 14 by angular deviation; and
- a standard graduation 15 by distance.

According to the invention, said display means 6 display, moreover, on this navigation screen ND:

- a plot 16 showing the optional trajectory TO; and
- a characteristic symbol 17 illustrating the position of said decision point 5.

Thus, by virtue of the device 1 in accordance with the invention, the pilot of the aircraft A knows the final point (decision point 5 which is located by the characteristic symbol 17 on the display screen 8), where he can still activate said optional trajectory TO so as to allow the aircraft A to follow it. Up to said decision point 5, the pilot is therefore presented with two alternatives. He can in fact:

- either continue to follow the main trajectory TP, carrying out no specific action for this purpose;
- or make the aircraft A follow said optional trajectory TO, by activating this optional trajectory TO with the aid of said means 9.

In a particular embodiment, if the pilot activates said optional trajectory TO which then becomes the new trajectory followed by the aircraft A, he can moreover transform (for example also with the aid of said means 9) the main trajectory TP initially followed by the aircraft A into a new optional trajectory.

Thus, the pilot can (by choice) swap the main route TP and the optional route TO, and can do so at any moment up to said decision point 5. This makes it possible in particular to go back after an activation made in error. Naturally, beyond said decision point 5, only the flight trajectory chosen, from the main trajectory TP and the optional trajectory TO, is preserved.

As may be seen in FIGS. 2 and 4, the decision point 5 corresponds to the point of divergence of the two trajectories TP and TO which are shared throughout the stretch TC which goes from the origin up to said decision point 5.

To determine said decision point 5, said means 2 carry out the following operations:

- onwards of said common point (in this instance the point of origin of the flight or, if the aircraft A has already commenced its flight, the point relating to the current position of the aircraft A, illustrated by the symbol 12), successively, for each point (for example each waypoint) along said main trajectory TP, in the direction of flight of the aircraft A, they verify whether this point also belongs to said optional trajectory TO; and
- as soon as a point no longer belongs to said optional trajectory TO, they take account of the previous point which still belonged to said optional trajectory TO and they regard this previous point as decision point 5.

This situation is represented for a two-dimensional trajectory in FIG. 2, in which is moreover represented a particular waypoint 18 (illustrated by a symbol 22) on the optional trajectory TO.

It is known that, when the two flight trajectories (main trajectory TP and optional trajectory TO) are three-dimensional trajectories, it may happen that these two trajectories TO and TP diverge in the vertical plane, as represented in FIG. 3, before diverging in the lateral plane, as illustrated on the corresponding navigation screen 8 represented in FIG. 4. This example is based on the two-dimensional trajectory presented in FIG. 2.

FIG. 3 illustrates the vertical profiles of the two trajectories TO and TP, namely the superposition of the vertical cuts along the two corresponding routes. The two routes pass through a point 19 (corresponding to the decision point 5 of the two-dimensional example in FIG. 2) in the lateral plane, but at different altitudes. In this example, the decision point 5 corresponds to the point of divergence in the vertical plane which is situated upstream of the point 19 (in the direction of flight) as represented in FIG. 4. This point 19 is also illustrated by a symbol 22 on the display screen 8.

In this three-dimensional example, the means 2 determine the decision point 5 by implementing a method similar to that stated above in respect of a two-dimensional trajectory.

Naturally, it is also possible to present the trajectories TO and TP, as well as the decision point 5 of the last example, on a standard display screen showing trajectories in three dimensions.

Additionally, in a particular embodiment, said means of actuation 9 form part of a control set 20 comprising an interactive display screen. This may be a specific screen or the display screen 8, the display means 6 then being connected by a link 21 to said means 9, as represented in FIG. 1.

An interactive screen 8 such as this is for example of the known liquid crystal LCD ("Liquid Crystal Display") type. An interactive screen such as this comprises objects (ranges, alphanumeric values, etc.) which are responsive to the presence of a cursor. The means 9 then comprise cursor control means (not represented specifically) making it possible to displace the cursor in such a way as to bring it onto a responsive object so as to designate it. When a responsive object such as this is designated, it is emphasized, in particular through a change of appearance such as a change of color or highlighting. The execution of a function associated with a responsive object is triggered by the validation of this previously designated responsive object. Consequently, said cursor control means comprise, for example:

- an actuatable means of displacement, preferably in the form of a spherical mouse or trackball, which is able to displace the cursor over the display screen 8 in such a way as to designate a responsive object; and
- an actuatable means of validation, for example a key, which is able to validate a responsive object which is designated by said cursor in such a way as to execute the function which is associated with said responsive object.

In the present case, the display screen 8 comprises at least one responsive object relating to the decision point 5. The selection of this responsive object (designation and validation) affords access to a menu listing the actions possible at this decision point 5. This menu is contextualized as a function of the properties of the decision point 5. In particular, for said decision point 5, an "activate the optional trajectory" command is made available. Said cursor control means therefore makes it possible to activate this command by designating and by validating this responsive object.

This preferred embodiment which allows simplified activation, uses modern interactive means of control that are very efficacious.

In a preferred embodiment, the device 1 in accordance with the invention forms part of an onboard automatic guidance system SG represented diagrammatically in FIG. 5. Said automatic guidance system SG which makes the aircraft A follow a flight trajectory automatically, in particular a main trajectory TP, comprises in standard fashion:

- a set 24 of information sources;
- an auxiliary source of information 23 able to provide a flight trajectory for the aircraft A;
- a central unit 25 which is connected by a link 26A to said set 24 and by a link 26B to said auxiliary source of information 23, and which is designed to automatically determine, with the aid of information received from said set 24 of information sources and a current flight trajectory provided by said auxiliary source of information 23, orders for steering the aircraft A allowing the latter to follow said current flight trajectory; and
- means of actuation 27 of controlled members 28 (control surface, etc.) of the aircraft A, to which the steering orders determined by said central unit 25 are applied automatically via a link 29.

According to the invention, said auxiliary source of information 23 comprises the aforesaid device 1 in accordance with the invention, for providing a current flight trajectory (namely either a main trajectory TP, or an optional trajectory TO after its activation), said link 26B possibly comprising (or corresponding to) the link 11 of FIG. 1.

The invention claimed is:

1. A method for providing an aircraft with a flight trajectory, said method comprising:
    a) defining a main trajectory (TP), which is followed by the aircraft, and at least one optional trajectory (TO) which deviates from said main trajectory (TP), which exhibits at least one common point (TC) shared with said main trajectory (TP) and which is able to be followed by the aircraft if said trajectory is activated;
    b) determining automatically a decision point (5) which indicates the last position of the aircraft along said main trajectory (TP), where said optional trajectory (TO) can still be activated so as to allow the aircraft to follow it;
    c) presenting automatically said decision point (5) to a pilot of the aircraft; and
    d) the pilot can, at least as a function of this presentation, activate said optional trajectory (TO).

2. The method as claimed in claim 1,
wherein, to determine said decision point (5):
    on the basis of said common point, successively, for each point following said main trajectory (TP), in the direction of flight of the aircraft, a check is carried out to verify whether this point also belongs to said optional trajectory (TO); and
    as soon as a point no longer belongs to said optional trajectory (TO), account is taken of the previous point which still belonged to said optional trajectory (TO) and this previous point is regarded as decision point (5).

3. The method as claimed in claim 2,
wherein a check is carried out to verify, in a lateral plane, whether a point of the main trajectory (TP) also belongs to the optional trajectory (TO).

4. The method as claimed in claim 2,
wherein a check is carried out to verify, in the whole of space, whether a point of the main trajectory (TP) also belongs to the optional trajectory (TO).

5. The method as claimed in claim 1,
wherein, if in step d) the pilot activates said optional trajectory (TO) which then becomes the new trajectory followed by the aircraft, the main trajectory (TP) initially followed by the aircraft is transformed into a new optional trajectory.

6. A device for providing an aircraft, with a flight trajectory,
which device comprises:
    first means for defining a main trajectory (TP), which is followed by the aircraft, and an optional trajectory (TO) which deviates from said main trajectory (TP), which exhibits at least one common point (TC) shared with said main trajectory (TP) and which is able to be followed by the aircraft if said trajectory is activated;
    second means for automatically determining a decision point (5) which indicates the last position of the aircraft along said main trajectory (TO), where said optional trajectory (TO) can still be activated so as to allow the aircraft to follow it;
    third means for automatically presenting said decision point (5) to a pilot of the aircraft; and
    fourth means which are actuatable, allowing a pilot to activate said optional trajectory (TO).

7. The device as claimed in claim 6,
wherein said third means comprise a head-up display screen (8).

8. The device as claimed in claim 6,
wherein said third means comprise a head-down display screen.

9. The device as claimed in claim 6, wherein said fourth means comprise interactive means of control.

10. An automatic guidance system for an aircraft, said guidance system (SG) comprising:
- a set of information sources;
- an auxiliary source of information able to provide a flight trajectory;
- a central unit for automatically determining orders for steering the aircraft, with the aid of information received from said set of information sources and a flight trajectory (TP, TO) provided by said auxiliary source of information; and
- means of actuation of controlled members of the aircraft, to which the steering orders determined by said central unit are applied automatically, wherein said central auxiliary source of information comprises a device such as specified under claim 6, for providing a flight trajectory (TP, TO).

11. An aircraft, which comprises a guidance system (SG) such as that specified under claim 10.

12. An aircraft, which comprises a device such as that specified under claim 6.

13. An aircraft, which comprises a device capable of implementing the method specified under claim 1.

* * * * *